(12) United States Patent
Glöcker

(10) Patent No.: US 6,317,608 B1
(45) Date of Patent: Nov. 13, 2001

(54) POWER AMPLIFIER MATCHING IN DUAL BAND MOBILE PHONE

(75) Inventor: Romàn Glöcker, Lauf (DE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/716,226

(22) Filed: Nov. 21, 2000

Related U.S. Application Data

(63) Continuation of application No. PCT/EP99/03530, filed on May 21, 1999.

(30) Foreign Application Priority Data

May 22, 1998 (DE) .............................. 198 23 060

(51) Int. Cl.$^7$ .................... H04B 1/38; H03H 7/38
(52) U.S. Cl. ............... 455/553; 455/82; 455/83; 455/159; 333/129; 333/101; 330/126
(58) Field of Search .................. 455/82, 83, 80, 455/81, 129, 115, 78, 553, 552, 180.1, 188.1, 101, 103, 127; 333/101, 124, 129, 132, 125, 126, 32; 330/126, 129, 124 R, 51

(56) References Cited

U.S. PATENT DOCUMENTS

| | | | |
|---|---|---|---|
| 4,723,306 | 2/1988 | Fuenfgelder et al. | 455/103 |
| 5,541,554 * | 7/1996 | Stengel et al. | 330/51 |
| 5,661,434 * | 8/1997 | Brozovich et al. | 330/51 |
| 5,774,017 | 6/1998 | Adar | 330/51 |
| 5,969,582 * | 10/1999 | Boesch et al. | 333/129 |
| 5,973,557 * | 10/1999 | Miyaji et al. | 330/51 |
| 6,078,794 * | 6/2000 | Peckham et al. | 455/127 |
| 6,091,966 * | 7/2000 | Meadows | 455/553 |
| 6,188,877 * | 2/2001 | Boesch et al. | 455/553 |
| 6,195,536 * | 2/2001 | Peckham et al. | 333/32 |
| 6,215,359 * | 4/2001 | Peckham et al. | 330/302 |
| 6,243,566 * | 6/2001 | Peckham et al. | 333/32 |

FOREIGN PATENT DOCUMENTS

| | | | | |
|---|---|---|---|---|
| 0 837 559 * | 4/1998 | (EP) | | H03F/3/72 |
| 10-126164 * | 5/1998 | (JP) | | H03F/1/02 |
| 10-190379 * | 7/1998 | (JP) | | H03F/1/02 |
| 99/01931 | 1/1999 | (WO) | | H03H/7/46 |
| 97/10650 | 3/1997 | (WO) | | H04B/1/40 |
| 99/62193 | 12/1999 | (WO) | | H04B/1/40 |

\* cited by examiner

Primary Examiner—William Trost
Assistant Examiner—Rafael Perez-Gutierrez
(74) Attorney, Agent, or Firm—Burns, Doane, Swecker & Mathis, L.L.P.

(57) ABSTRACT

To achieve an improved matching of a power amplifier to transmission line impedances of different transmission branches in a dual band mobile phone there is proposed a new power amplifier output circuit for such a dual band mobile phone. This power amplifier output circuit comprises a transmission branch change over unit being connected to an output terminal of the power amplifier. Further, there is provided a second impedance matching means in at least one transmission branch and the transmission branch change over unit comprises at least two switching elements between the first impedance matching unit and the second impedance matching unit. Therefore, the disturbing influence of parasitic elements in the switching elements may be reduced significantly.

15 Claims, 6 Drawing Sheets

FIG. 2
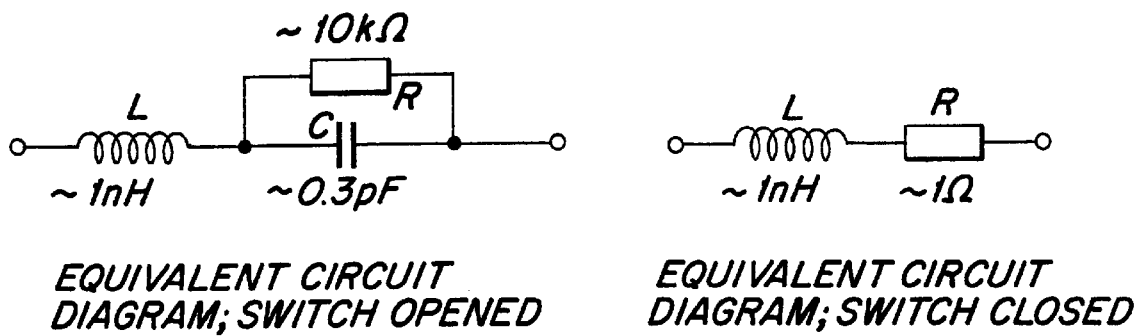
EQUIVALENT CIRCUIT
DIAGRAM; SWITCH OPENED
EQUIVALENT CIRCUIT
DIAGRAM; SWITCH CLOSED
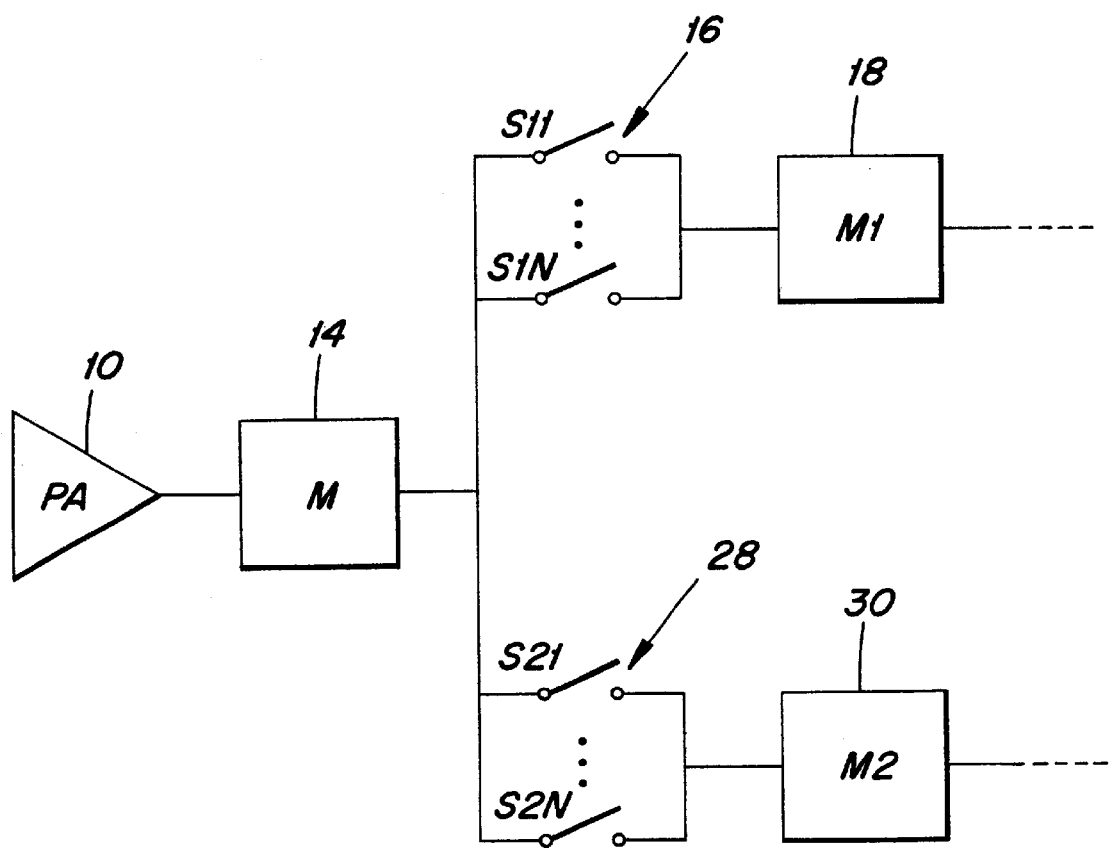
FIG. 3

GSM 900 MHz

DCS 1800 MHz

- ℓ  LINE ELEMENT
- pC PARALLEL C
- sL SERIES INDUCTIVITY
- sR SERIES RESISTER (PARASITIC R OF PIN-DIODE(S))
- Za OUTPUT IMPEDANCE OF POWER AMPLIFIER

POWER AMPLIFIER MATCHING IN DUAL BAND MOBILE PHONE

This application is a continuation of PCT application Ser. No. PCT/EP99/03530 filed on May 21, 1999.

FIELD OF INVENTION

The present invention relates to an improved power amplifier matching in dual band mobile phones, in particular to a power amplifier output circuit for a dual band mobile radio unit according to the preamble of claim 1.

BACKGROUND OF INVENTION

Currently, mobile phones are operated predominantly with a single operating frequency. FIG. 7 shows a realization of such a transmitter/receiver operation in a mobile phone being operated with a single operating frequency, e.g., with approximately 900 MHz for GSM, approximately 1800 MHz for DCS or approximately 1900 MHz for PCS. An antenna 100 being used to transmit signals and to receive signals is connected to a transmitter/receiver change over unit 102. The transmitter/receiver change over unit 102 comprises a transmitter switch TX and a receiver switch RX. In the receiving mode, the transmitter switch TX is opened and the receiver switch RX is closed. To the contrary, in a transmitting mode the transmitter switch TX is closed and the receiver switch RX is opened.

In the transmitter mode, a power amplifier 104 outputs a transmitting signal in the pre-specified frequency band. Here, an impedance matching is carried out through an impedance matching circuit 106 such that the output of the power amplifier sees an impedance which in most cases is lower than the impedance of the following transmission branch, e.g., 50 $\Omega$.

However, the circuit design shown in FIG. 7 more and more limits the increasing use of digital mobile telephony since the number of subscribers is continuously increasing while the number of transmitting frequencies and related transmission channels is limited. Although an increased transmitting frequency of, e.g., approximately 1800 MHz for DCS or approximately 1900 MHz for PCS in comparison to approximately 900 MHz for GSM enables an increased number of transmission channels, this is only possible at the expense of reduced working ranges for the transmitter stations.

Nevertheless, a combination of different technical advantages for the different approaches through provision of cellular dual band networks and dual band mobile phones adapted thereto seems to be promising, e.g., a combination of the GSM-frequency band with the DCS- or PCS-frequency band.

Heretofore, in U.S. Pat. No. 5,774,017 there is proposed a dual-band amplifier for wireless communication, in particular for operation at either the 800 MHz or the 1900 MHz band. The described dual band amplifier provides desired gain and input/output impedance. Switching impedance networks are used at the input and output of a power amplifier to provide matching input impedance and a desired output impedance for operation in two bands.

FIG. 8 shows another option of a corresponding power amplifier output circuit designed for the necessary transmission/receiving operation in a dual band mobile phone. This approach directly relies on the circuit design shown in FIG. 7.

Here, the antenna 200 is connected to two transmitter/receiver change over units 202 and 204. The sending/receiving change over unit 202 comprises a transmitter switch TXa and a receiver switch RXa for a first transmitter frequency. Further, the transmission/receiving change over unit 204 comprises a transmitter switch TXb and a receiver switch RXb for a second transmitter frequency. The different switches TXa, RXa, TXb, and RXb are operated in accordance with the different operation frequencies, respectively, as outlined above with respect to FIG. 7. Further, a diplexer 206 is necessary to join the two transmission paths to the antenna 200 without losses. For the amplification of the transmitting signals in the frequency bands, there are provided related power amplifiers 214 and 216. For these power amplifiers 214 and 216 an impedance matching is realized through impedance matching circuits 218 and 220 provided in each of the two transmission branches. Alternatively, the two power amplifiers 214 and 216 for the two transmitting frequencies can be substituted through a single power amplifier with two output terminals and a downstream impedance matching circuit.

This direct generalization of the single band transmitting/receiving circuit shown in FIG. 7 leads to the advantage that the different transmission branches for both transmitting frequency bands are completely decoupled. However, while suitable impedance matching of the different transmitting frequency bands is achieved through the separated and fully decoupled provision of the impedance matching circuits this is only achieved with a high circuit complexity. On the one hand this leads to an increase in the production costs and on the other hand also the space requirements necessary for such a dual band transmitting/receiving change over unit constitute a barrier for the implementation thereof.

In view of the above, the object of the present invention is to achieve an improved matching of a power amplifier outputting transmitting signals in different transmitting frequency bands over a single output terminal to impedances of the different transmission branches in a dual band mobile phone.

According to the invention, this object is achieved through a power amplifier output circuit for a dual band mobile radio unit according to claim 1. The power amplifier output circuit comprises a first transmitter/receiver change over means for transmitting/receiving a first transmitting/receiving signal, the transmitter/receiver change over means being provided with an input terminal to which a first impedance matching means is connected, a second transmitter/receiver change over means for transmitting/receiving a second transmitting/receiving signal, a transmission branch change over means to selectively connect the first transmitter/receiver change over means or the second transmitter/receiver change over means to a power amplifier outputting transmitting signals in two frequency bands such that a second impedance matching means is provided between an output terminal of the power amplifier and the transmission branch change over means and the transmission branch change over means comprises at least two switching elements being connected in parallel in a branch connecting the power amplifier with the first transmitter/receiver change over means.

Therefore, for the present invention the stepwise approach to impedance matching in at least one transmission branch of the power amplifier output circuit is of importance as well as the simultaneous use of a plurality of switching elements connected in parallel. Both measures in functional relationship lead to a significant minimization of parasitic disturbances in the power amplifier output circuit. At the same time, there is also achieved a suitable impedance matching for the respective frequency bands and transmitting powers in both transmission branches.

Further, while the use of only a single impedance matching at the output of the power amplifier will not lead to an optimum impedance matching for both transmission branches according to the present invention this is achieved, firstly, through the first common impedance matching at the output of the power amplifier and, secondly, through a further impedance matching optimized for each transmitting frequency band, respectively. Further, since the common impedance matching is used for both. frequency bands the circuit complexity may be reduced significantly.

Still further, the present invention takes into account that the power absorption in parasitic elements of the transmission branch change over means increases when the disturbing real part of the impedance of the transmission branch change over means lies close to the output impedance of the power amplifier. E.g., the real part of output impedances of practically used power amplifiers lies in the range from approximately 5 to 6 Ω while typical connecting resistances of different switching elements lie in the range of approximately 1 Ω. In case switching elements are inserted in the transmission branch change over unit only after a first impedance transformation, e.g., to approximately 20 Ω at 900 MHz for GSM or 50 Ω for 1800 MHz for DCS, the power absorption in the parasitic elements is significantly reduced due to a smaller ratio between switching element connecting resistance and impedance level at the input terminal to the switching element, e.g., the ratio being smaller by an order of magnitude.

According to the present invention the power absorption through the parasitic elements may be further significantly reduced by providing at least two switching elements in at least one transmission branch of the transmission branch change over means. Through the parallel connection the parasitic resistance and the parasitic inductance due to the necessary switching between the first and the second impedance matching are reduced by a factor corresponding essentially to the number of switching elements connected in parallel.

Besides the minimization of the absorbed power the switching elements connected in parallel also contribute to an improved impedance matching. Due to the decreased overall connecting resistance and the decreased overall parasitic inductance between the first and second impedance matching stage, respectively, the overall impedance matching gets less sensitive towards the disturbing influence of the switching elements.

According to a preferred embodiment of the invention there is provided a third impedance matching means at an input terminal of the second transmitter/receiver change over means.

Thus, there is provided an optimized matching in the single transmission branches specifically adapted to the respective transmitting frequency and transmitting power, e.g., 3 W for approximately 900 MHz and 1.5 W for approximately 1800 MHz. However, since part of the impedance matching for the different transmission branches is achieved through the common impedance matching circuit connected to the output terminal of the power amplifier the circuit complexity specifically necessary for the different transmission branches is minimized.

According to yet another preferred embodiment of the present invention the transmission branch change over means between the second impedance matching means and the third impedance matching means comprises at least one switching element.

Usually, the transmission branches are provided to output transmitting signals with a lower transmitting frequency, e.g., approximately 900 MHz for GSM, and a higher transmitting frequency, e.g., approximately 1800 MHz for DCS and approximately 1900 MHz for PCS. Here, it should be noted that the impedance matching at the output of the power amplifier leads to different results for the different frequency bands. In particular, in the transmission branch for the higher frequency band there is achieved an almost complete matching to the necessary impedance level through the impedance matching means at the output terminal of the power amplifier such that parasitic elements in the related branch of the transmission branch change over means only have a minor influence. According to this preferred embodiment of the invention, the object is to provide measures against parasitic effects via frequency selective way only for the lower frequency band while minimizing the additional costs for switching elements. In other words, switching elements are only inserted to an extent necessary for the selected transmitting frequency.

According to yet another preferred embodiment of the present invention, there is provided a switchable band stop filter between the second impedance matching means and the third impedance matching means to filter the harmonics of the first transmitting signal during the transmission of the first transmitting signal in the second transmission path.

The power amplifier is usually operated near saturation. This leads to the generation of harmonics, e.g., at approximately 1800 MHz, approximately 2700 MHz, . . . in the GSM-transmitting mode and also to the generation of harmonics at approximately 3600 MHz, etc. in the DCS-transmitting mode. Usually, harmonics of first order are dominating.

Although in the GSM-transmitting mode the harmonics at approximately 1800 MHz, approximately 2700 MHz, . . . are low pass filtered in the first transmission branch, the first harmonic at approximately 1800 MHz of the GSM transmitting mode is not suppressed through a low pass filter in the second transmission branch being only adapted to harmonics of the second transmitting signal at approximately 3600 MHz, etc. The same holds true for a combination of the transmitting frequencies for GSM and PCS with a transmitting frequency of approximately 1900 MHz. Generally speaking, this problem arises for power amplifier outputting transmitting signals in a plurality of transmitting frequency bands in case harmonics of the first, lower transmitting frequency lie below the second, higher transmitting frequency or are identical thereto.

To solve this problem the second transmission branch is advantageously provided with a switchable band stop filter being adapted to suppress specifically during the transmission of the first lower transmitting frequency the first harmonic thereof in the second transmission branch. This allows for an optimum decoupling of the different operation modes.

According to yet another preferred embodiment of the invention the transmission change over means between the first impedance matching means and the second impedance matching circuit consists of a first diode of a PIN-type and a second diode of the PIN-type such that the first diode of the PIN-type and the second diode of the PIN-type are connected in parallel. Preferably, the first diode of the PIN-type and the second diode of the PIN-type are comprised in a single package or housing.

Thus, during fabrication and operation of the power amplifier output circuit according to the present invention only a single component must be handled and supplied with power. During fabrication placement of components is essentially unchanged so that approved circuit layouts and fabrication processes may be maintained essentially without any modification.

According to yet another preferred embodiment of the present invention the first impedance matching means has a first capacitor connected in shunt configuration at its input. Further, the first impedance matching circuit comprises a second capacitor in series between the input and the output thereof.

Usually, the impedance matching is achieved in the single transmission branches through a sequence of capacitors and inductivities. Also different line elements for the connection of the components and parasitic inductivities of the switching elements are considered. According to the present invention, it is taken into account that capacitors usually are only available with capacitances lying in a prespecified basic grid, e.g., according to 3.3 pF, 3.9 pF, 4.7 pF, 5.6 pF, etc. The increased number of capacitances in the first impedance matching circuit results in a finer gradation for the impedance transformation and thus in an improved impedance matching. This is a particular advantage for transmission branches carrying the transmitting signal in the lower transmitting frequency range.

Preferred embodiments of the invention will be described in the following under reference to the drawing in which:

FIG. 2 shows an equivalent circuit diagram for the switches shown in FIG. 1 according to the opened and closed state thereof;

FIG. 3 shows a schematic diagram of the power amplifier output circuit according to the present invention;

FIG. 1 shows the basic structure of a power amplifier output circuit for a dual band mobile phone according to the present invention.

Figure 1:
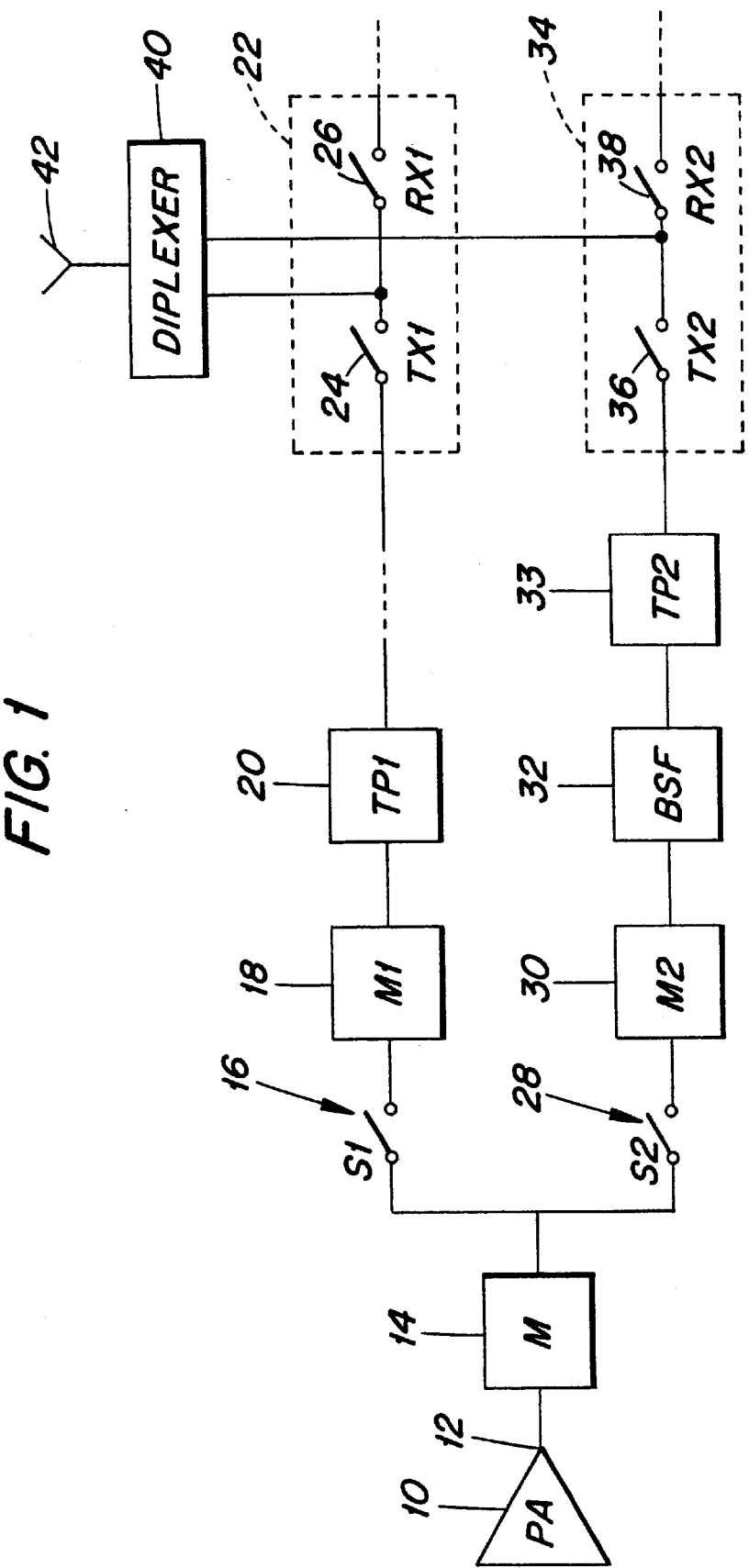
FIG. 1 shows the basic structure of a power amplifier output circuit for a dual band mobile phone where a single output amplifier outputs transmitting signals in different frequency bands via a single output terminal.

As shown in FIG. 1, a power amplifier 10 is connected at its output terminal 12 to a first impedance matching circuit 14. At the output terminal of the first impedance matching circuit 14 there is connected a first switch 16 connecting the first impedance matching circuit 14 to a first transmission branch.

The first transmission branch comprises a series connection with a second impedance matching circuit 18, a first low pass filter 20 and a first transmitter/receiver change over unit 22 and is operated in a first frequency band. To switch between the transmitter and receiver operation mode, the first transmitter/receiver change over unit 22 comprises a first transmitter switch 24 and a first receiver switch 26.

As also shown in FIG. 1, at the output of the first impedance matching circuit 14 there is also connected a second switch 28 connecting the first impedance matching circuit 14 to a second transmission branch.

The second transmission branch comprises a series connection with a third impedance matching circuit 30 and a switchable band stop filter 32 being operated to suppress the first harmonic of the transmitting signal carried on the first transmission branch in the second transmission branch during transmission of the first transmitting signal. Further, a second low pass filter 33 is provided to suppress the harmonics of the transmitting signal carried on the second transmission branch. To switch between the transmitter and the receiver operation mode the second transmitter/receiver change over unit 34 comprises a second transmitter switch 36 and a second receiver switch 38.

The center tap between the first transmitter switch 24 and the first receiver switch 26 and the center tap between the second transmitter switch 36 and the second receiver switch 38 are connected to a diplexer 40, respectively, being provided to join the single transmission/receiving paths without loss to an antenna 42.

In a first operative mode where the power amplifier 10 outputs a transmitting signal in a first frequency band with a first transmitting frequency f1 the first switch 16 is closed and the second switch 28 is opened. The first impedance matching circuit 14 and the second impedance matching circuit 18 achieve an optimum matching of the output impedance of the power amplifier 10 to the load impedance necessary for the first transmitting frequency and power.

Since the power amplifier 10 is operated near saturation the output thereof comprises not only the transmitting signal itself with the frequency f1 but also harmonics thereof at the frequencies 2*f1, 3*f1, .... These undesired harmonics are suppressed in the first transmission branch through the first low pass filter 20 and the filtered transmitting signal is outputted to the antenna 42 via the first transmitter switch 24.

While this enables the filtering of harmonics of the first transmitting signal in the first operative mode for the reason of non-ideal behaviour of the first switch 16 and the second switch 28 further measures are necessary to avoid the undesired transmission of these harmonics via the second transmission branch. E.g., when considering a combination of the transmitting frequency for GSM at approximately 900 MHz and for DCS at approximately 1800 MHz the first harmonic of the GSM transmitting signal is not suppressed through the second low pass filter 33 lying in the second transmission branch for DCS at approximately 1800 MHz being only adapted to harmonics of the second transmitting signal at approximately 3600 MHz. Generally, this problem arises for each power amplifier outputting transmitting signals with a plurality of transmitting frequencies in case harmonics of the first, lower transmitting frequency lie below the second, higher transmitting frequency or are identical thereto.

According to the present invention it is therefore proposed to provide a switchable band stop filter 32 in the second transmission branch being adapted to specifically suppress the first harmonic of the first, lower transmitting frequency signal in the second transmission branch during transmission of the first transmitting signal. This allows for an optimum decoupling of the different operative modes.

As also shown in FIG. 1, in a second operation mode where the power amplifier 10 outputs a transmitting signal in a second frequency band or with a second transmitting frequency, respectively, the first switch 16 is opened and the second switch 28 is closed.

In this case, the first impedance matching circuit 14 and the third impedance matching circuit 30 achieve an optimum matching of the output impedance of the power amplifier 10 onto the load impedance necessary for the second transmitting frequency and power.

Again, harmonics are generated at 2*f2, 3*f2, . . . . These harmonics are suppressed in the second low pass filter 33 before the output of the transmitting signal to the antenna 42 via the second transmitter switch 36.

The basic structure of a power amplifier output circuit according to the present invention shown in FIG. 1 allows to consider the fact that an optimum impedance matching for transmission branches through only a single impedance matching circuit at the output of the power amplifier may not be achieved. To the contrary, on the one hand this may only be achieved through the stepwise impedance matching using a common impedance matching circuit at the output of the power amplifier and on the other hand through an additional impedance matching circuit optimized for each transmitting frequency band. Due to the impedance matching provided in common for both transmission branches the circuit complexity may be significantly decreased.

In case of an ideal switching behaviour of the first switch 16 and the second switch 28, respectively, the output of the transmitting signals in both frequency bands through the power amplifier 10 with only a single output would be completely realized.

However, as is shown in FIG. 2 with equivalent circuit diagrams for switches in the opened and closed state, switches used in practice, e.g., diodes of the PIN-type exhibit a non-ideal behavior. The damping for an opened switch is limited and gets increasingly lower for higher frequencies. For diodes of the PIN-type the damping lies in the range of 25 dB for 900 MHz and 10 dB for 1800 MHz.

FIG. 3 shows the solution according to the present invention for a power amplifier output circuit. Here, circuit components having the same functionality as the circuit components shown in FIG. 1 are denoted by the same reference numerals.

As shown in FIG. 3, the first switch 16 of the transmission branch of the change-over unit comprises at least two first switching elements S11, . . . , S1N. Further, the second switch 28 of the transmission branch change-over unit comprises at least one second switching element S21, . . . , S2N.

Operatively, all first switching elements S11, . . . , S1N are closed during the transmission of the first transmitting signal with the first transmitting frequency and therefore connected in parallel. Further, during transmission of the second transmitting signal with the second transmitting frequency all second switching elements S21, . . . , S2N are closed and thus connected in parallel.

Operatively, through the parallel connection of the first switching elements S11, . . . , S1N and the second switching elements S21, . . . , S2N there is achieved a decrease in the connecting resistance and parasitic inductance of the first and second switch 16 and 28, respectively. Here, the factor for the decrease essentially corresponds to the number of first switching elements S11, . . . , S1N and second switching elements S21, . . . , S2N connected in parallel.

For the functionality of the power amplifier output circuit according to the present invention shown in FIG. 3 it is also of importance that the first switching elements S11, . . . , S1N and the second switching elements S21, . . . , S2N are provided downstream the common impedance matching circuit 14, respectively. The reason for this is that the power absorption in the parasitic elements of the first switching elements S11, . . . , S1N and S21, . . . , S2N respectively, increases when the disturbing real part of the impedance of the related transmission branch is closed to the output impedance of the power amplifier. In case the first switching elements S11, . . . , S1N and the second switching elements S21, . . . , S2N are provided downstream a first impedance matching circuit implementing an impedance transformation to approximately 20 Ω at approximately 900 MHz for GSM or approximately 50 Ω at approximately 1800 MHz for DCS the power absorption in the parasitic elements is significantly decreased due to the increased impedance level at the respective input terminals.

For the functionality of the power amplifier output circuit according to the present invention shown in FIG. 3, it is also of importance that due to a decreased overall connecting resistance and a decreased overall parasitic inductance of the first switch 16 and the second switch 28 the impedance matching is less sensitive towards disturbances caused by the switching elements.

Figure 4:
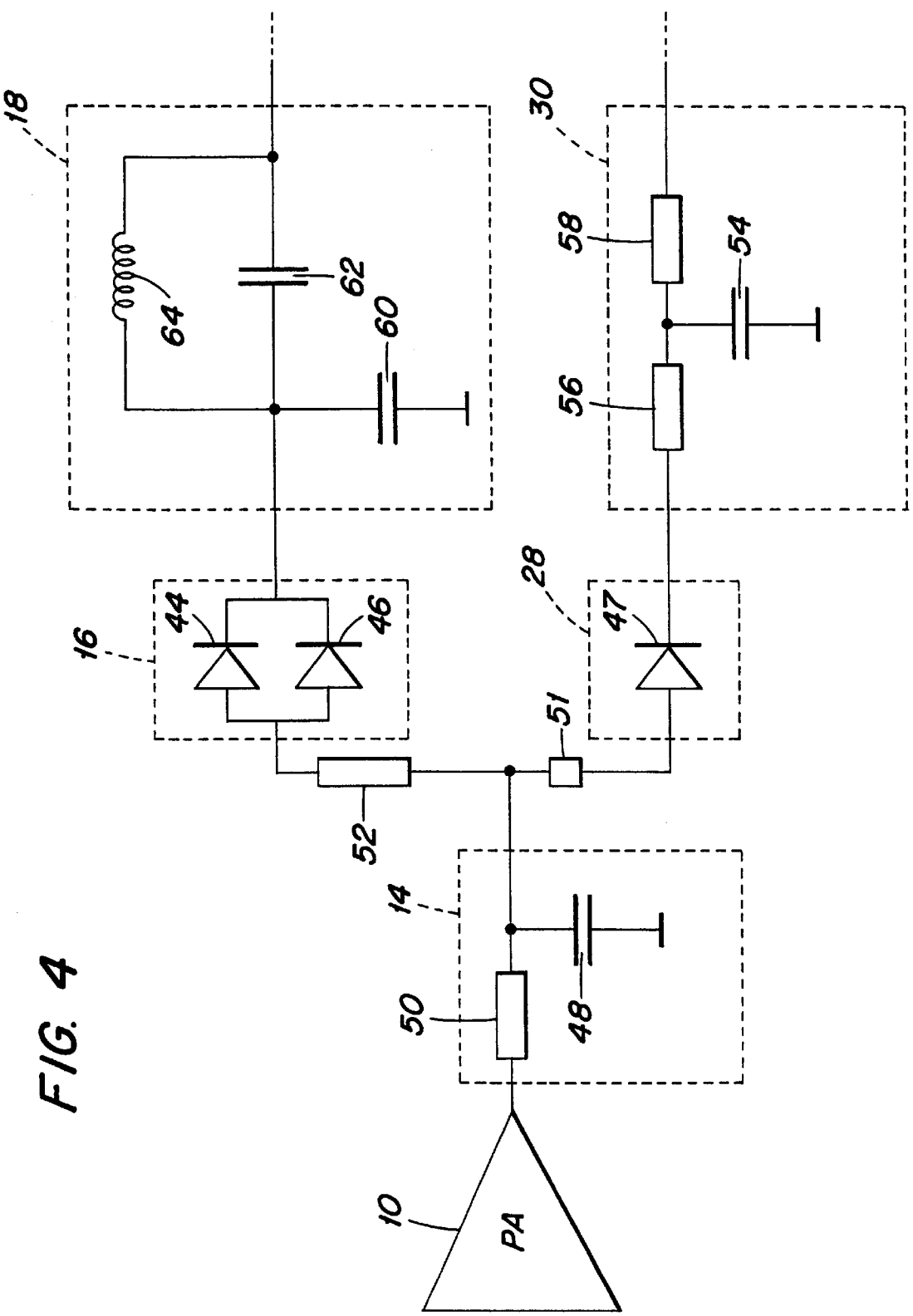
FIG. 4 shows a circuit diagram of the power amplifier output circuit according to the present invention.

FIG. 4 shows a circuit diagram for the realization of the power amplifier output circuit according to the present invention.

As shown in FIG. 4, the first switch 16 comprises a first diode of the PIN-type 44 and a second diode of the PIN-type connected across thereto. Preferably, the first diode of the PIN-type 44 and the second diode of the PIN-type 46 are accommodated in a single housing and are supplied with power through the same power supply.

As also shown in FIG. 4, the second switch 28 comprises only a single diode of the PIN-type 47. Without restricting the scope of the present invention it is assumed here that the transmitting signal with the first lower transmitting frequency is transmitted by the first switch 16 and that the transmitting signal with the second higher transmitting frequency is transmitted via the second switch 28. The reason why the second switch 28 comprises only a single diode of the PIN-type 47 is that here the impedance matching for the higher frequency band is almost fully accomplished, e.g., to 50 Ω for DCS at approximately 1800 MHz. Therefore, the influence of the parasitic resistance (approximately 1 Ω) of the connecting diode of the PIN-type 47 is so low that measures against parasitic elements become obsolete.

As also shown in FIG. 4, the impedance matching circuit 14 connected to the output of the power amplifier 10 comprises a first line element 50 at the input thereof, wherefrom a first capacitor 48 branches off to ground before the output terminal of the impedance matching circuit 14. The first line element 50 functions as serial inductivity for the impedance matching. In FIG. 4, further line elements 52 and 51 are shown which reflect different geometrical layout configurations for the connection of the different transmission branches to the power amplifier 10.

As also shown in FIG. 4, the impedance matching circuit 30 in the second transmission branch comprises two serially connected line elements with an intermediate connecting point wherefrom a second capacitor 54 branches off to ground.

As also shown in FIG. 4, the impedance matching circuit 18 in the first transmission branch comprises a third capacitor 60 connected in shunt configuration at the input thereof and further a fourth capacitor 62 serially connected between the input and output thereof. The fourth capacitor 62 is bridged with an inductivity 64.

Figure 5:
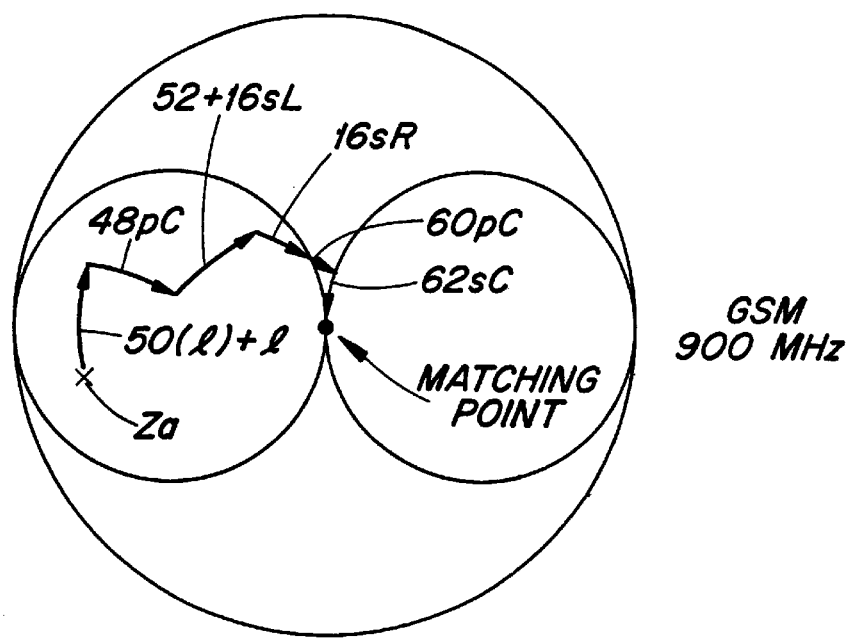
FIG. 5 illustrates the functionality of the components and line elements shown in FIG. 4 and also the impact of parasitic elements onto the impedance matching in a GSM-transmission branch.

FIG. 5 shows as an example the functionality of the components and line elements shown in FIG. 4 as well as the influence of parasitic elements onto the impedance matching in a GSM-transmission branch.

As shown in FIG. 5, the impedance matching is achieved starting from the output impedance Za of the power amplifier 10 with a sequence of transformation steps shown in a Smith chart diagram. The transmission from the output impedance Za of the power amplifier 10 to the matching point shown in FIG. 5 is achieved in the first transmission branch via partial transformation steps realized according to the sequence line element 50, first capacitor 48, line elements 52, parasitic inductivity of the first switch 16, parasitic resistance of the first switch 16, third capacitor 60 and fourth capacitor 62.

The fourth capacitor 62 of the impedance matching circuit in the first transmission branch is provided since capacitances are normally only available according to discrete grid-like capacitance values, e.g., 3.3 pF, 3.9 pF, 4.7 pF, 5.6 pF, etc. The fourth capacitor 62 allows for a finer tuning of the impedance transformation and thus for a more precise impedance matching. The inductivity 64 serves for a DC-decoupling.

Figure 6:
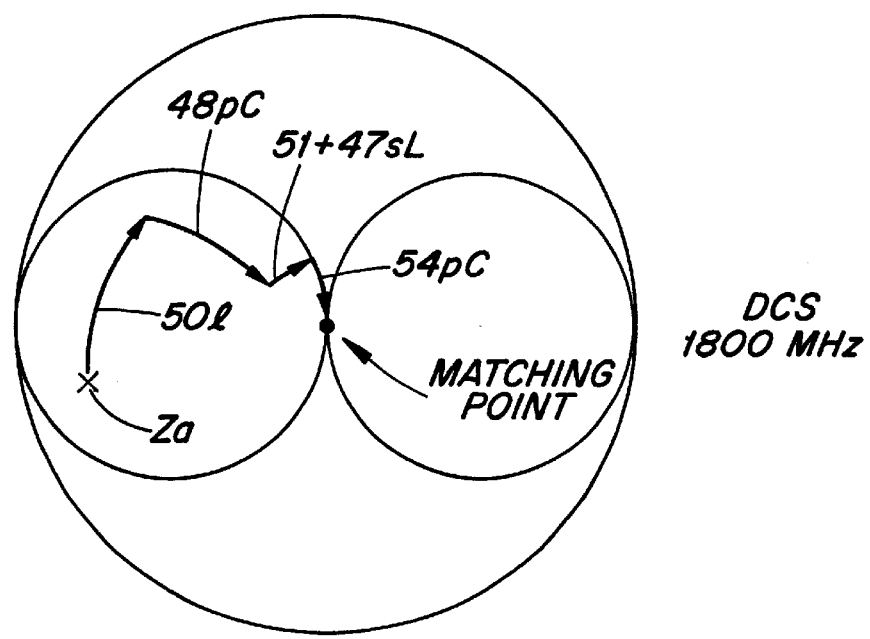
FIG. 6 illustrates the functionality of the components and line elements shown in FIG. 4 as well as the impact of parasitic elements onto the impedance matching in a DCS-transmission branch.
Figure 7:
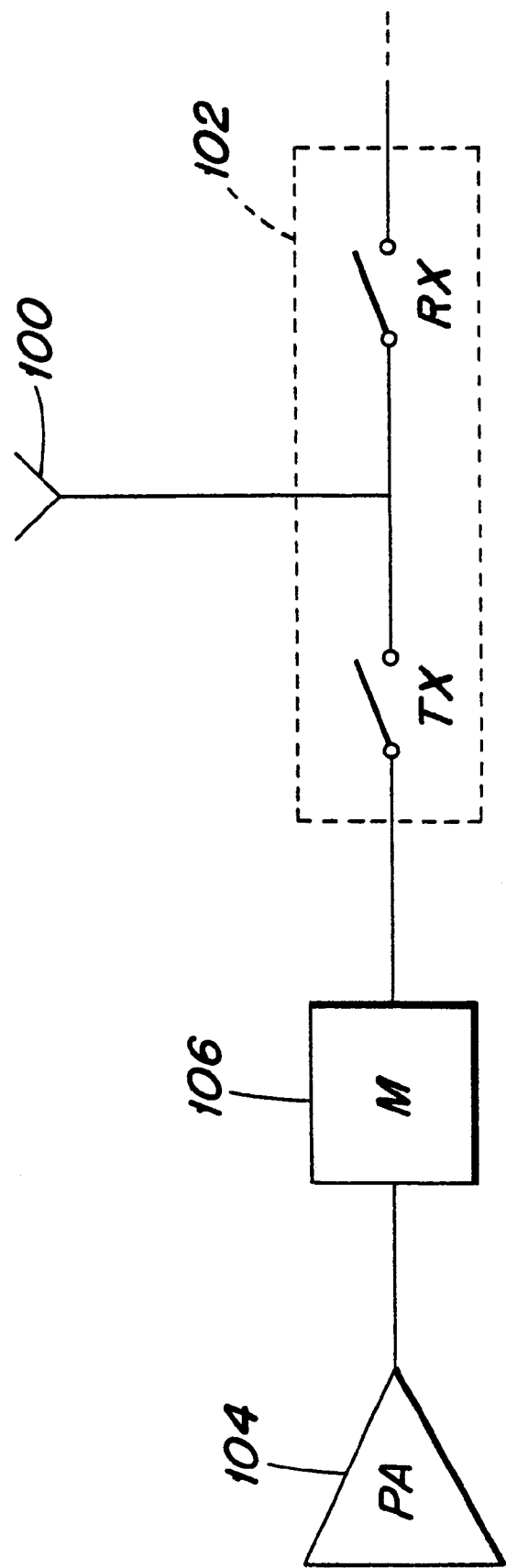
FIG. 7 shows a schematic diagram for a power amplifier output circuit for a single band mobile phone.
Figure 8:
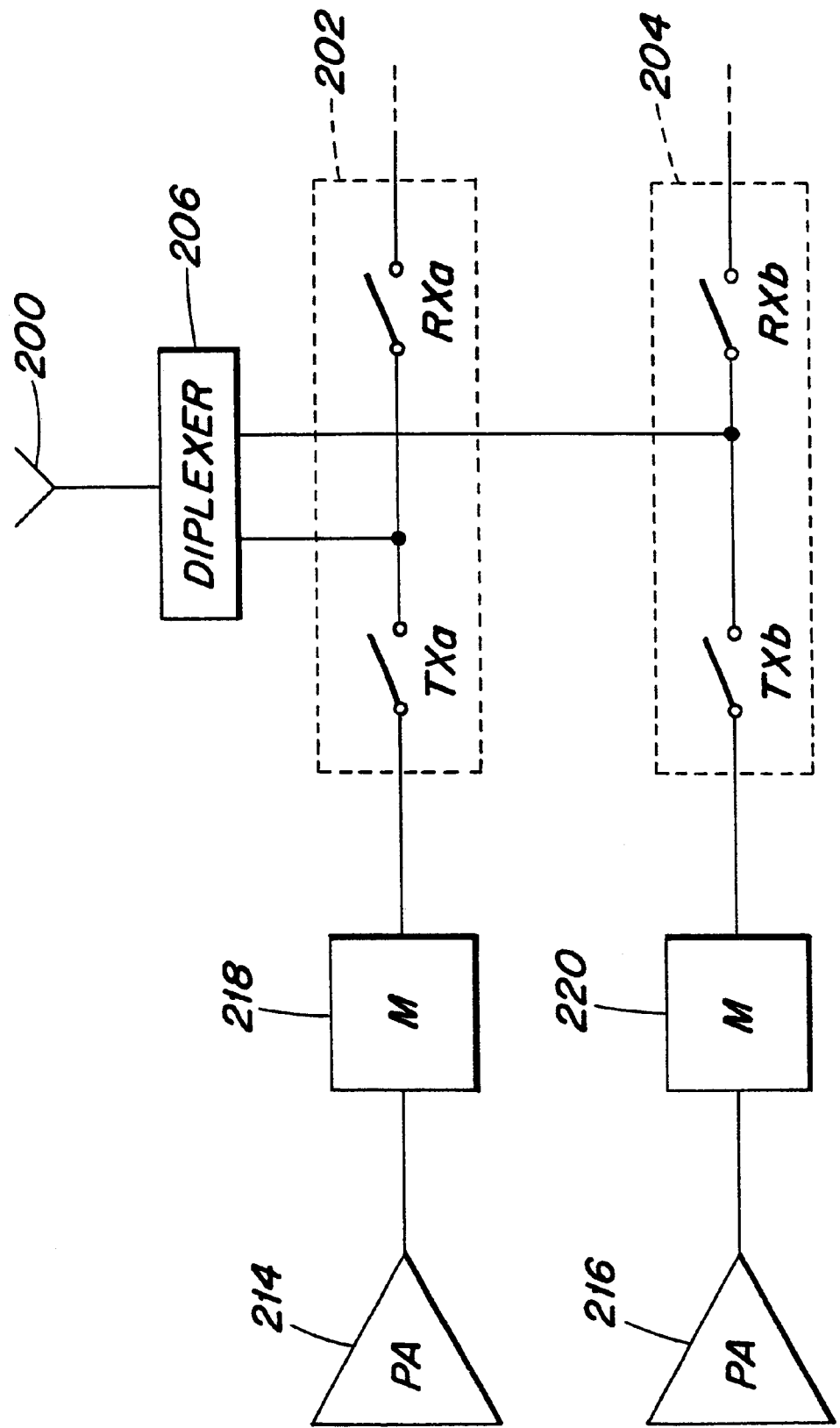
FIG. 8 shows a schematic diagram for a power amplifier output circuit for a dual band mobile phone with two power amplifiers and related impedance matchings.

FIG. 6 shows as an example the functionality of the circuit components and line elements shown in FIG. 4 as well as the influence of parasitic elements onto the impedance matching in a DCS-transmission branch.

As shown in FIG. 6, also in the second transmission branch the impedance matching is achieved starting from the output impedance Za of the power amplifier 10 via a sequence of transformation steps implemented through the sequence of line element 50, first capacitor 48, line element 51 and parasitic inductivity of the second switch 28 and second capacitor 54. In FIG. 6 the line elements 56 and 58 have been neglected.

As already outlined above with reference to FIG. 4 the parasitic resistance of the second switch 28, e.g., the third diode of the PIN-type 47 only plays a minor role in the second transmission branch due to the higher frequency band such that the corresponding partial transformation step in the Smith chart diagram shown in FIG. 6 is omitted. Further, a capacitor comparable to the fourth capacitor 62 can be omitted due to the higher frequency band therefore reducing the circuit complexity in the second transmission branch.

What is claimed is:

1. A power amplifier output circuit for a dual band mobile radio unit, comprising:
    a first transmitter/receiver change over unit for transmitting/receiving a first transmitting/receiving signal, said first transmitter/receiver change over unit being provided with an input terminal receiving said first transmitting signal to which a first impedance matching unit is connected,
    a second transmitter/receiver change over unit for transmitting/receiving a second transmitting/receiving signal,
    a transmission branch change over unit to selectively connect said first transmitter/receiver change over unit or said second transmitter/receiver change over unit to a power amplifier outputting transmitting signals in two frequency bands, wherein
    a second impedance matching unit is provided between an output terminal of said power amplifier and said transmission branch change over unit,
    the transmission branch change over unit comprises at least two switching elements being connected in parallel in a first transmission branch which connects said power amplifier with said first transmitter/receiver change over unit,
    a third impedance matching unit is provided at an input terminal of said second transmitter/receiver change over means, and
    a switchable band stop filter is provided downstream said third impedance matching means that filters harmonics of said first transmitting signal in said second transmission branch during the transmission of said first transmitting signal.

2. A power amplifier output circuit for a dual band mobile radio unit, comprising:
    a first transmitter/receiver change over unit for transmitting/receiving a first transmitting/receiving signal, said first transmitter/receiver change over unit being provided with an input terminal receiving said first transmitting signal to which a first impedance matching unit is connected,
    a second transmitter/receiver change over unit for transmitting/receiving a second transmitting/receiving signal,
    a transmission branch change over unit to selectively connect said first transmitter/receiver change over unit or said second transmitter/receiver change over unit to a power amplifier outputting transmitting signals in two frequency bands, wherein
    a second impedance matching unit is provided between an output terminal of said power amplifier and said transmission branch change over unit,
    the transmission branch change over unit comprises at least two switching elements being connected in parallel in a first transmission branch which connects said power amplifier with said first transmitter/receiver change over unit,
    a third impedance matching unit is provided at an input terminal of said second transmitter/receiver change over means, and
    said transmission branch change over unit is realized with a third diode of said PIN-type between said second impedance matching unit and said third impedance matching unit.

3. The power amplifier output circuit of claim 2, wherein said first impedance matching unit is provided with a first capacitor at an input thereof, said first capacitor being connected in Shunt-configuration.

4. The power amplifier output circuit of claim 3, wherein a second capacitor is connected in series between said input of said first impedance matching unit and an output of said first impedance matching unit.

5. The power amplifier output circuit of claim 4, wherein an inductivity is connected across said second capacitor.

6. A power amplifier output circuit for a dual band mobile radio unit, comprising:
    a first transmitter/receiver change over unit for transmitting/receiving a first transmitting/receiving signal, said first transmitter/receiver change over unit being provided with an input terminal receiving said first transmitting signal to which a first impedance matching unit is connected,
    a second transmitter/receiver change over unit for transmitting/receiving a second transmitting/receiving signal,
    a transmission branch change over unit to selectively connect said first transmitter/receiver change over unit or said second transmitter/receiver change over unit to a power amplifier outputting transmitting signals in two frequency bands, wherein
a second impedance matching unit is provided between an output terminal of said power amplifier and said transmission branch change over unit,
the transmission branch change over unit comprises at least two switching elements being connected in parallel in a first transmission branch which connects said power amplifier with said first transmitter/receiver change over unit,
a third impedance matching unit is provided at an input terminal of said second transmitter/receiver change over unit, and
a second line element is provided between an input and an output of said third impedance matching means and a third line element is connected in series to said second line element in said third impedance matching unit.

7. The power amplifier output circuit of claim 6, wherein a fourth capacitor branches off to ground at a connection point between said second line element and said third line element.

8. A power amplifier output circuit for a dual band mobile radio unit, comprising:
a first transmitter/receiver change over unit for transmitting/receiving a first transmitting/receiving signal, said first transmitter/receiver change over unit being provided with an input terminal receiving said first transmitting signal to which a first impedance matching unit is connected,
a second transmitter/receiver change over unit for transmitting/receiving a second transmitting/receiving signal,
a transmission branch change over unit to selectively connect said first transmitter/receiver change over unit or said second transmitter/receiver change over unit to a power amplifier outputting transmitting signals in two frequency bands, wherein
a second impedance matching unit is provided between an output terminal of said power amplifier and said transmission branch change over unit,
the transmission branch change over unit comprises at least two switching elements being connected in parallel in a first transmission branch which connects said power amplifier with said first transmitter/receiver change over unit, and
said transmission branch change over unit is realized with a first diode of the PIN-type and a second diode of the PIN-type between said first impedance matching unit and said second impedance matching unit such that first diode of the PIN-type and said second of the PIN-type are connected in parallel.

9. The power amplifier output circuit of claim 8, wherein said first diode of the PIN-type and said second diode of said PIN-type (46) are accommodated in a single package.

10. A power amplifier output circuit for a dual band mobile radio unit, comprising:
a first transmitter/receiver change over unit for transmitting/receiving a first transmitting/receiving signal, said first transmitter/receiver change over unit being provided with an input terminal receiving said first transmitting signal to which a first impedance matching unit is connected,
a second transmitter/receiver change over unit for transmitting/receiving a second transmitting/receiving signal,
a transmission branch change over unit to selectively connect said first transmitter/receiver change over unit or said second transmitter/receiver change over unit to a power amplifier outputting transmitting signals in two frequency bands, wherein
a second impedance matching unit is provided between an output terminal of said power amplifier and said transmission branch change over unit,
the transmission branch change over unit comprises at least two switching elements being connected in parallel in a first transmission branch which connects said power amplifier with said first transmitter/receiver change over unit, and
a low pass filter is provided between said first impedance matching unit and said first transmitter/receiver change over unit for the filtering harmonics of said first transmitting signal.

11. A power amplifier output circuit for a dual band mobile radio unit, comprising:
a first transmitter/receiver change over unit for transmitting/receiving a first transmitting/receiving signal, said first transmitter/receiver change over unit being provided with an input terminal receiving said first transmitting signal to which a first impedance matching unit is connected,
a second transmitter/receiver change over unit for transmitting/receiving a second transmitting/receiving signal,
a transmission branch change over unit to selectively connect said first transmitter/receiver change over unit or said second transmitter/receiver change over unit to a power amplifier outputting transmitting signals in two frequency bands, wherein
a second impedance matching unit is provided between an output terminal of said power amplifier and said transmission branch change over unit, and
the transmission branch change over unit comprises at least two switching elements being connected in parallel in a first transmission branch which connects said power amplifier with said first transmitter/receiver change over unit, wherein
a first line element is provided at an input of said second impedance matching unit.

12. The power amplifier output circuit of claim 11, wherein at an end of said first line element lying at an output side a third capacitor is connected to ground.

13. A power amplifier output circuit for a dual band mobile radio unit, comprising:
a first transmitter/receiver change over unit for transmitting/receiving a first transmitting/receiving signal, said first transmitter/receiver change over unit being provided with an input terminal receiving said first transmitting signal to which a first impedance matching unit is connected,
a second transmitter/receiver change over unit for transmitting/receiving a second transmitting/receiving signal,
a transmission branch change over unit to selectively connect said first transmitter/receiver change over unit or said second transmitter/receiver change over unit to a power amplifier outputting transmitting signals in two frequency bands, wherein
a second impedance matching unit is provided between an output terminal of said power amplifier and said transmission branch change over unit, and
the transmission branch change over unit comprises at least two switching elements being connected in parallel in a first transmission branch which connects said power amplifier with said first transmitter/receiver change over unit.

14. The power amplifier output circuit of claim 13, which comprises a third impedance matching unit at an input terminal of said second transmitter/receiver change over unit.

15. The power amplifier output circuit of claim 14, wherein said transmission branch change over unit comprises at least one switching element between said second impedance matching unit and said third impedance matching unit.

* * * * *

UNITED STATES PATENT AND TRADEMARK OFFICE
CERTIFICATE OF CORRECTION

PATENT NO. : 6,317,608 B1
DATED : November 13, 2001
INVENTOR(S) : Roman Glöckler It is certified that error appears in the above-identified patent and that said Letters Patent is hereby corrected as shown below:

<u>Title page,</u>
Item [75], please correct the name of the inventor from:

"[75] Ròman Glöcker" to read

-- [75] Roman Glöckler --

Signed and Sealed this

Twenty-fifth Day of February, 2003

JAMES E. ROGAN
*Director of the United States Patent and Trademark Office*